(12) United States Patent
Sarkar et al.

(10) Patent No.: US 9,424,091 B2
(45) Date of Patent: Aug. 23, 2016

(54) DEPLOYING SOFTWARE IN A MULTI-INSTANCE NODE

(71) Applicant: Silicon Graphics International Corp., Milpitas, CA (US)

(72) Inventors: Sanhita Sarkar, Fremont, CA (US); Raymon Morcos, Sunnyvale, CA (US)

(73) Assignee: SILICON GRAPHICS INTERNATIONAL CORP., Milpitas, CA (US)

( * ) Notice: Subject to any disclaimer, the term of this patent is extended or adjusted under 35 U.S.C. 154(b) by 100 days.

(21) Appl. No.: 14/266,758

(22) Filed: Apr. 30, 2014

(65) Prior Publication Data

US 2014/0331239 A1    Nov. 6, 2014

Related U.S. Application Data

(60) Provisional application No. 61/818,282, filed on May 1, 2013, provisional application No. 61/888,412, filed on Oct. 8, 2013.

(51) Int. Cl.
*G06F 3/00* (2006.01)
*G06F 9/44* (2006.01)
*G06F 9/46* (2006.01)
*G06F 13/00* (2006.01)
*G06F 9/50* (2006.01)

(52) U.S. Cl.
CPC .................... *G06F 9/5027* (2013.01)

(58) Field of Classification Search
CPC ...................................... G06F 9/5027
USPC .......................................... 719/320
See application file for complete search history.

(56) References Cited

U.S. PATENT DOCUMENTS

2009/0055834 A1* 2/2009 Ding ............... G06F 9/5077 718/104

* cited by examiner

*Primary Examiner* — Timothy A Mudrick
(74) *Attorney, Agent, or Firm* — Polsinelli LLP (57) ABSTRACT

A system for deploying big data software in a multi-instance node. The optimal CPU memory and core configuration for a single instance database is determined. After determining an optimal core-memory ratio for a single instance execution, the software is deployed in multi-instance mode on single machine by applying the optimal core-memory ratio for each of the instances. The multi-instance database may then be deployed and data may be loaded in parallel for the instances.

30 Claims, 6 Drawing Sheets

DEPLOYING SOFTWARE IN A MULTI-INSTANCE NODE

CROSS REFERENCE TO RELATED APPLICATIONS

This application claims the priority benefit of U.S. provisional application No. 61/818,282, titled "Flexible, Scalable, and Integrated Big Data Ecosystem for Data Ingestion, Analytics, and Visualization," filed May 1, 2013, and the priority benefit of U.S. provisional application No. 61/888,412, titled "Deploying Big Data Software in a Multi-Instance Node," filed Oct. 8, 2013, the disclosures of which are incorporated herein by reference.

BACKGROUND

1. Field of the Invention

The present invention generally relates to executing applications software that process big data. More specifically, the present invention relates to implementing big data software in a single multi-instance node.

2. Description of the Related Art

Applications software that process big data tend to stress system resources with a large load. To deal with this, big data applications are often run on multiple machines. When multiple copies of big data software are running on multiple machines, they can process large amounts of data more quickly than only one such machine.

Processing big data on multiple machines has disadvantages. When multiple machines execute multiple copies of big data software, the software copies often need to communicate with each other. These multiple machines each have an IP address and communicate over a network such as the Internet. Communication between machines over a network, wherein each machine has its own IP address, inherently will introduce delays due to network latency. Additional steps for data aggregation across the network to deliver the ultimate result incur further delays.

Figure 1:
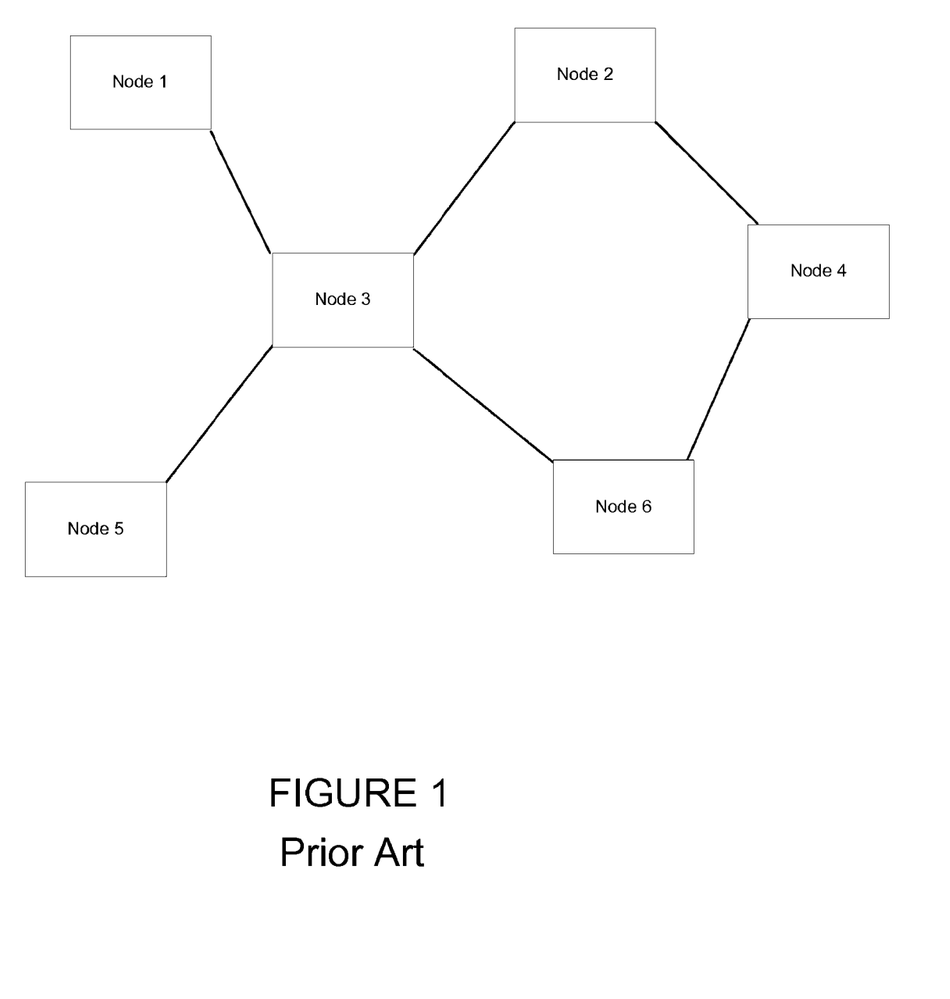
FIG. 1 is a block diagram of a cluster of nodes of the prior art.

FIG. 1 is a block diagram of a cluster of nodes of the prior art. The cluster of nodes includes nodes 1-6. Each node may include memory, a processor with one or more cores, and other computing components. When processing large amounts of data, a copy of a big data software application may execute on each node. Different copies of the same software may be loaded onto and executed by each node in order to achieve faster processing of large amounts of data. The nodes each have their own IP address and communicate with each other over one or more networks, which introduces latency in the processing of the data.

The delay in processing data and aggregating the result set by big data software degrades performance of the big data software and may even cause errors due to latency. What is needed is an improved method for processing data by big data software.

SUMMARY

A technique is provided for deploying big data software in a multi-instance mode on a large, coherent shared memory many-core computing system for high performance and scalability. Most big data software running in a single instance mode has limitations in scalability when running on a many-core and large coherent shared memory system. A configuration and deployment technique using a multi-instance approach maximizes system performance and resource utilization, reducing latency and providing scalability as needed.

In an embodiment, a method for deploying big data software in a multi-instance mode may begin with determining a core-memory ratio for a single instance execution. A number of instances may be determined in a multi-instance database. The optimal core-memory ratio may be applied to each instance.

In an embodiment, a system may deploy big data software in a multi-instance node. The system may include a processor, memory, and one or more modules stored in memory. The one or more modules may be executable by the processor to determine a core-memory ratio for a single instance execution of a software program, determine a number of instances of the software to deploy in a multi-instance database, and apply the optimal core-memory ratio to each instance by a module stored in memory and executed by a processor.

DETAILED DESCRIPTION

A system is provided for deploying big data software in a multi-instance mode on a large, coherent shared memory many-core computing system for high performance and scalability, such as for example the SGI UV 2000 offered by Silicon Graphics International Corp. of Milpitas, Calif. First, the application requirements of system memory and the number of computer processing unit (CPU) cores are determined. The number of application instances may then be determined. Finally, multiple application instances may be deployed.

Most big data software running in a single instance mode has limitations in scalability when running on a many-core and large coherent shared memory system. A configuration and deployment technique using a multi-instance approach may be implemented to maximize system performance and resource utilization.

The present system improves the performance of big data software by following a three step configuration design pattern on many-core, large memory systems. After determining an optimal core-memory ratio for a single instance execution, the software is deployed in multi-instance mode by applying the optimal core-memory ratio for each of the instances.

A technique is provided for deploying big data software in a multi-instance mode on a large, coherent shared memory many-core computing system for high performance and scalability. Most big data software running in a single instance mode has limitations in scalability when running on a many-core and large coherent shared memory system. A configuration and deployment technique using a multi-instance approach maximizes system performance and resource utilization, reducing latency and providing scalability as needed.

The present technology automatically provides a multi-step configuration design pattern on many-core, large memory systems. After determining an optimal core-memory ratio for a single instance execution, the software is deployed in multi-instance mode by applying the optimal core-memory ratio for each of the instances. The invention may include a web service that manages user accounts, shares content with existing web services, and provides its own social networking platform. Users may access their accounts and utilize the invention web services via the invention web service itself, applications embedded in other web services, or mobile device applications.

Figure 2:
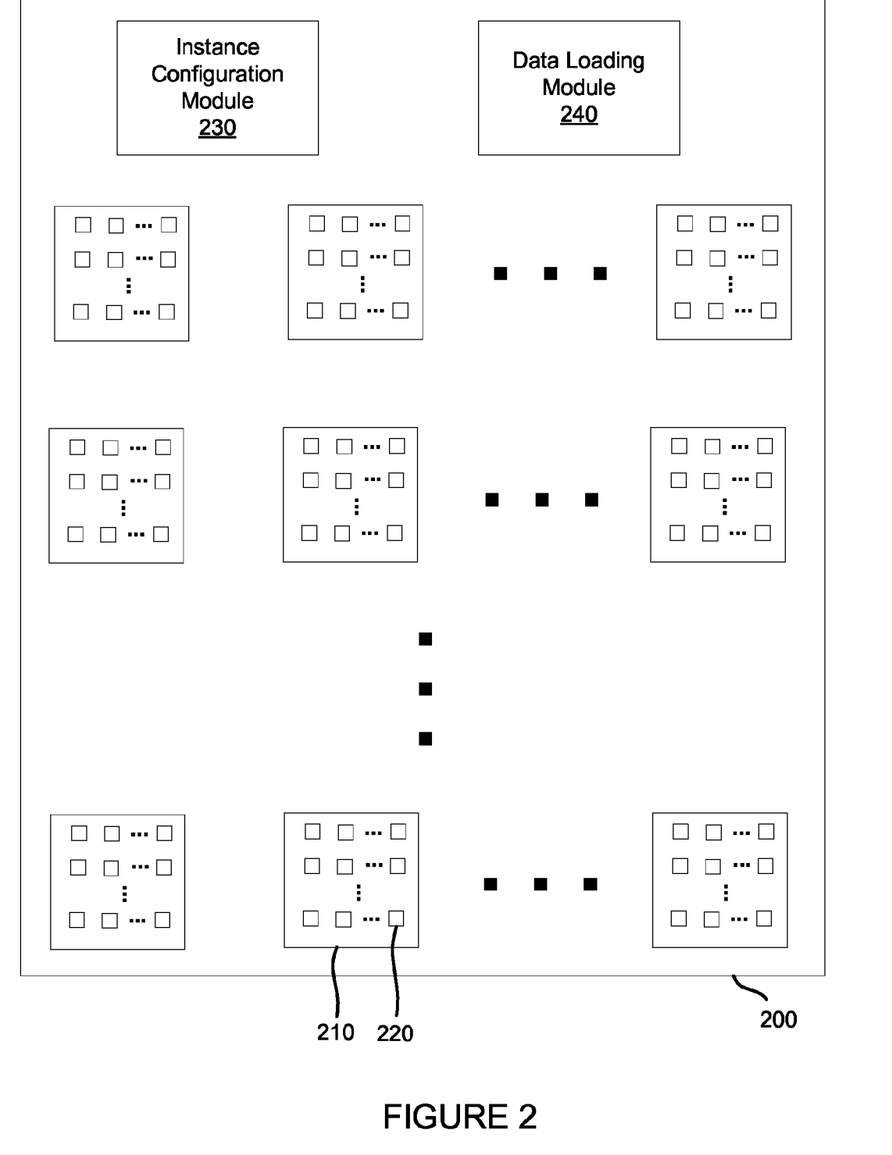
FIG. 2 is a block diagram of a system having a high number of cores.

FIG. 2 is a block diagram of a system having a high number of cores. The machine 200 includes a plurality of sockets 210. Each socket may include a plurality of cores 220. For example, the system 200 may include 128 sockets, with each socket including 15 cores, for a total of 1,920 cores. The sockets may each include multiple memory DIMM slots, such as for example, 12 memory DIMM slots each populated with 32 GB DIMMs providing a total of 48 TB system memory.

The cores of each socket may be grouped into an instance which processes a software application. For example, the cores of a particular socket may form one or more instances, and cores from multiple adjacent sockets may form an instance. The instances may be formed from a number of cores and memory such that they are able to host and execute a software instance as efficiently as possible.

The machine may also include an instance configuration module and a data loading module. Each module may be stored in memory and executed by a processor to perform one or more operations. The instance configuration module may configure one or more instances to maximize scalability and efficiency of the machine resources. The data loading module may determine the most efficient way load data into one or more instances of core groups in parallel. Both of these functions are discussed in more detail herein.

Figure 3:
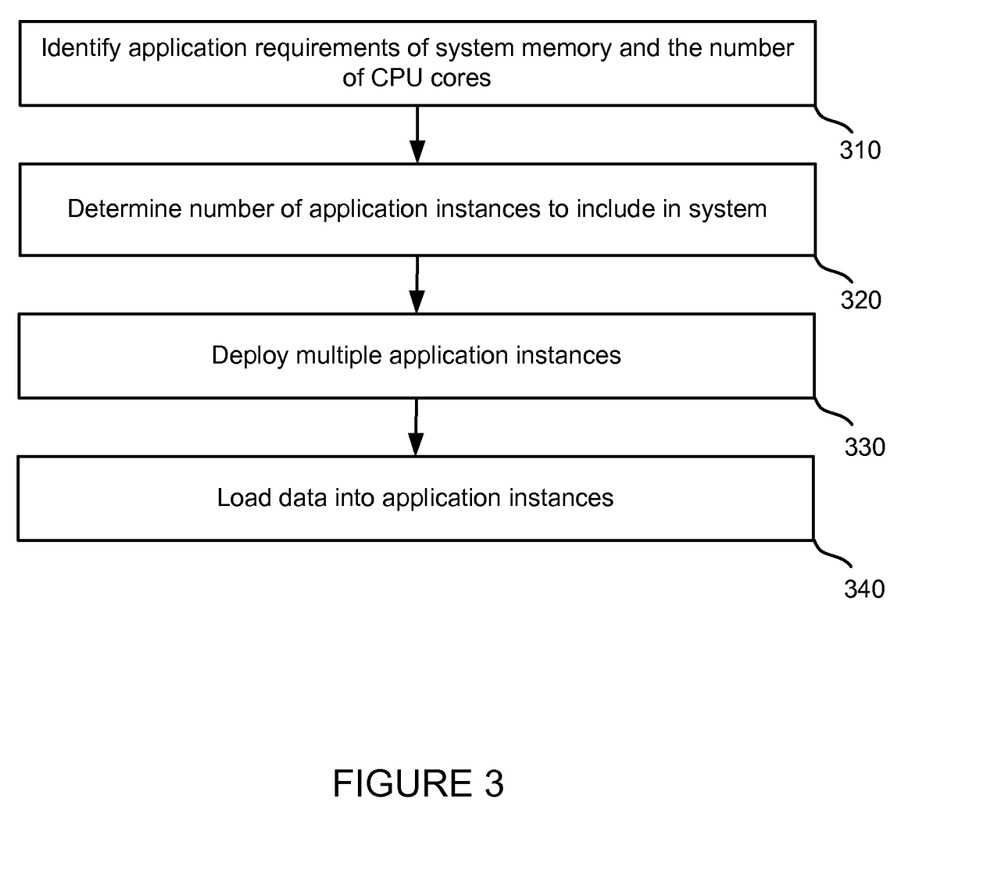
FIG. 3 is a method for deploying software in a multi-instance node.

FIG. 3 illustrates a method for deploying software in a multi-instance mode. First, application requirements of a system memory and the number of CPU cores are identified at step 310. This step may help determine whether the application is memory intensive, CPU intensive, or both.

Application requirements for memory usage may be determined by performing a test of the system on which the application instances will be deployed. An automated testing application (such as instance configuration module 230), user, or combination of both may run a workload/benchmark test using a single instance of the application on a system. The test may execute for a period of time, for example an hour, until the application reaches a steady state. The memory usage may then be stored once the application has reached the steady state. For example, a benchmark application may include a UNIX system-related command such as "SAR" or other command to retrieve the memory usage at the desired state.

The number of CPU cores to utilize may be determined by performing a test of the system on which the application instances will be deployed. An automated testing application, user, or combination of both may run a workload/benchmark test using a single instance of the application system. The application may determine whether CPU usage by the instance is just above a certain threshold, such as for example above 85%.

If CPU usage falls below the threshold, then more cores are being utilized then needed or desired, and the test may be repeated or continued with a lower number of cores. For example, while running the test, a command such a NUMA command may be issued to reduce the number of cores for the single application instance until the application requires 85% of the allocated cores. For instance, on a UV system with 128 cores, if 16 cores are allocated to the application instance, then CPU usage should be around 12% (out of 128 cores). More detail for determining the number of cores to utilize for an instance is provided with respect to the method of FIG. 4.

In some embodiments, the CPU usage for an instance may be measured using a "sar-u" command. An example usage of the command is as follows:

$ sar-u <measurement interval in seconds><No. of times the result shown>.

Thus, if one wants to measure the cpu usage for every 30 seconds for 100 times, then the command will be "$ sar-u 30 100". Similarly, to measure the cpu usage for every 60 seconds for 1200 times, then the command will be "$ sar-u 60 1200."

Depending on the application workload duration, one may come up with various values for interval seconds and umber of iterations. One such formula below that can be used to determine the values is: Workload duration in seconds=interval in seconds×Number of iterations.

The number of application instances may be determined at steps 320. The instances may be the lesser of the ratio of total memory to memory usage and the ratio of total cores to used cores. The ratio of total memory to memory usage may be determined as the total memory in the system divided by the memory used by the application in the steady state. The core ratio may be determined by dividing the total number of cores in the system to the number of cores required to run a single application at less than a threshold value (e.g., 85%). Both ratios may be determined by an application stored in memory and executed by a processor of the present system, such as a testing application. The lesser of the two ratio values is taken as the number of application instances.

Below is a table that exemplifies the core allocation to a single application instance followed by the number of instances allocated to a 128-core system.

TABLE 1

Core Allocation per Application Instances.

| Allocated cores to one Application Instance | Max % CPU usage of a single application's instance | Possible Number of Application Instances |
|---|---|---|
| 128 | 85 | 1 |
| 64 | 42.5 | 2 |
| 32 | 21.25 | 4 |
| 16 | 10.63 | 8 |
| 8 | 5.31 | 16 |
| 4 | 2.66 | 32 |

The application instances may be deployed at step 330. The application instances may be installed on the system and executed to process multiple subsets of cores and memory. In some embodiments, the multiple instances may be executed by a multi-threaded program to ensure they are started (or terminated) at about the same time when data is processed.

The instance configuration module may ensure that each instance is invoked with an allocation of cores and memory space. For example, instance configuration module 230 executing on a multi-instance computing system may issue NUMA commands to allocate the core count and memory size allocated to each instance of the application.

To optimize the performance from a single application instance, several steps may be taken by the application. For example, the cores and memory may be allocated from within the same NUMA nodes. Alternatively, the cores and memory may be allocated from adjacent NUMA nodes. The application may set a memory policy to be local or allocate cores from local memory of a NUMA node or adjacent NUMA nodes if an application requires memory policy as "interleave."

Once the instances are deployed, data may be loaded into the application instances for processing at step 340. Data may be loaded into each instance in parallel, based on CPU and I/O performance, to provide the data for processing more quickly. The data may be identified via files for loading into each instance. More details on loading data into an application instance are discussed with respect to the method of FIG. 5.

Figure 4:
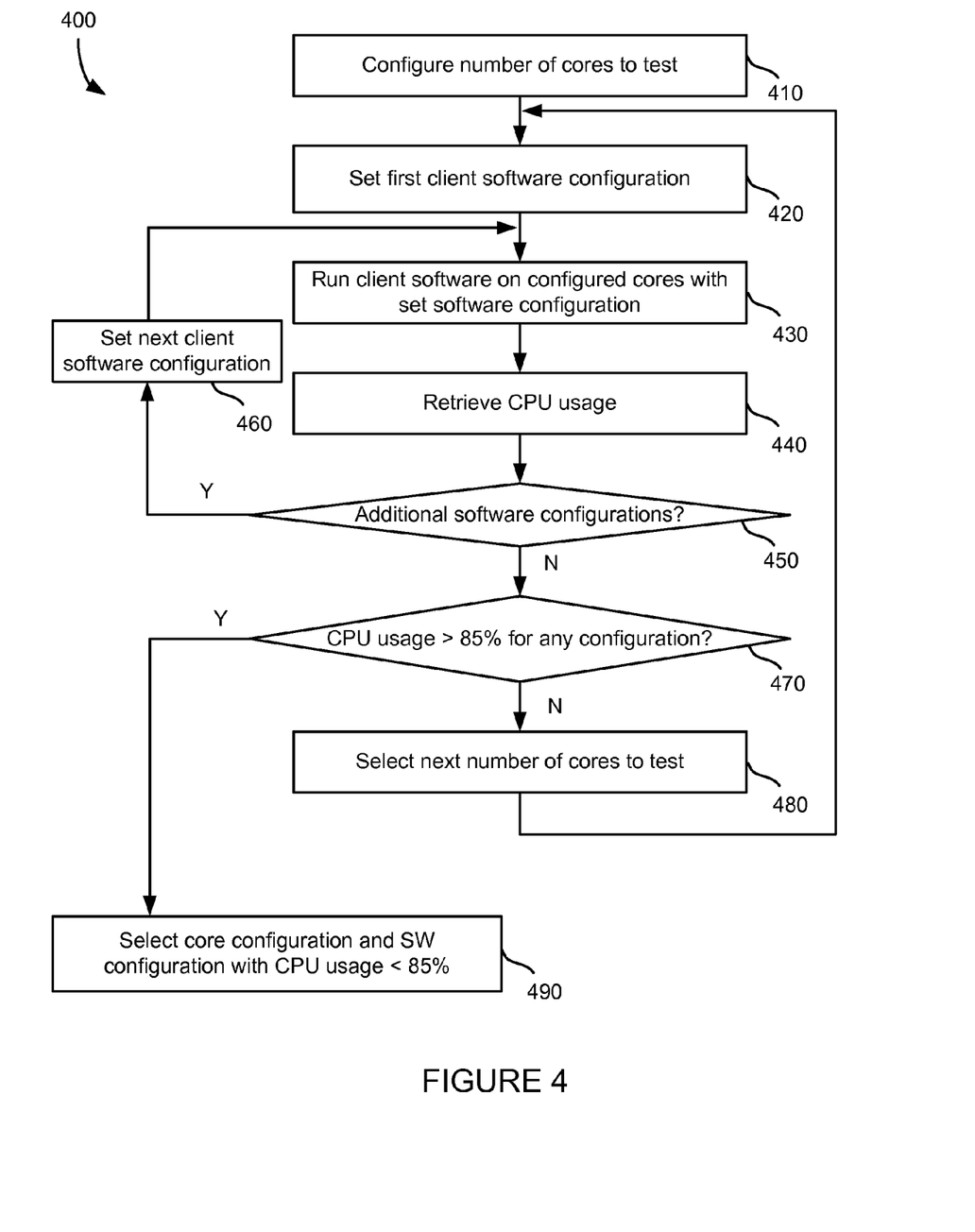
FIG. 4 is a method for identifying application requirements of a system memory and the number of CPU cores.

FIG. 4 is a method for identifying application requirements of a system memory and the number of CPU cores. In some embodiments, the method of FIG. 4 provides more detail for step 310 of the method of FIG. 3. First, a number of cores to test is configured at step 410. The core number may be any default number or selected number, and serves as a starting point for the test. A first client software configuration is then set at step 420. In some embodiments, for each core count, a test may be run at least once for each software configuration. Configurations that may be made to software include settings for memory allocation, thread allocation, and other software allocation parameters. Client software is run on the configured cores with the set software configuration at step 430.

CPU usage for the running software is then retrieved at step 440. A determination is then made as to whether there are any additional software configurations at step 450. If there are additional configurations, the next client software configuration is set at step 460 and the method of FIG. 4 returns to step 430. If no further software configurations are to be made, a determination is made as to whether the CPU usage for any software configuration and core is greater than 85% for any configuration.

For example, to estimate the number of cores that can be allocated to a single application instance within a threshold of 85% CPU usage, an application may apply a formula as follows:

$$\text{Max} \cdot CPU \cdot usage_{instance} = \frac{Cores_A}{Cores_T} \times 85,$$

Wherein Max. CPU.usage$_{instance}$ is the maximum percentage CPU usage of a single application instance, Cores$_A$ is the number of cores allocated to the application instance, and Cores$_T$ is the total number of cores in the system.

If the CPU usage for any of the configurations for the particular core count is not greater than 85%, the next number of cores to test is selected at step 480 and the method of FIG. 4 returns to step 420. If the CPU usage does go over 85%, the core configuration and software configuration with CPU usage just under 85% is then selected for use at step 490.

Figure 5:
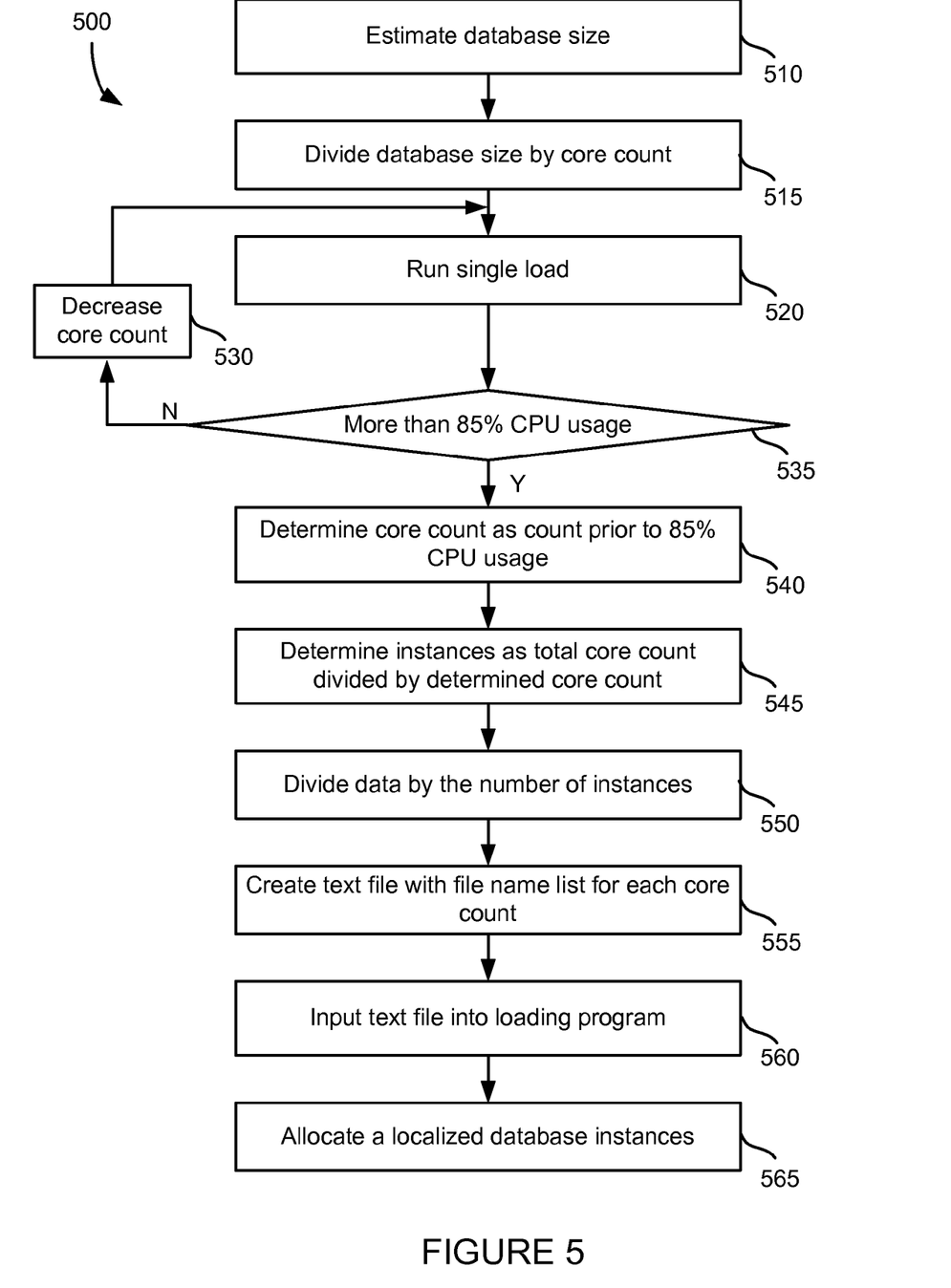
FIG. 5 is a method for loading data into application instances.

FIG. 5 is a method for loading data into application instances. The method of FIG. 5 may provide more detail for step 340 in the method of FIG. 3. First, a database size is estimated at step 510. After estimating that size, the database size is divided by a core count at step 515. The core count may be retrieved from the method of FIG. 4. A single load may be run at step 520, and a determination is made as to whether more than 85% of CPU usage is occurring at step 525. If more than 85% of a CPU is being used, the method of FIG. 5 continues to step 530. If not, the core count is reduced at step 535 and the method continues to step 520.

A core count is determined as the total core count divided by the determined core count at step 545. Data is then divided by the number of instances at step 550 and a text file is created with a file name list for each core count at step 555. The text file is then input into the loading program at step 560. A localized database instance is allocated at step 565

The present technology differs from previous solutions in that it configures a non-uniform shared memory system with multiple instances for processing data. In particular, the instances may move data through non-uniform memory architecture (NUMA) links within a system rather than through InfiniBand backplane communication links. The NUMAlink data transfer between the instances of the system provide for much quicker data transfer rates than those associated with InfiniBand® techniques. The data sharing in the present technology occurs within a single box in a single memory space using the NUMA links, rather than being processed as a system to system data transfer operation. The aggregation of result set across multiple instances happens within the single box rather than transferring the subset of results as a system-to-system data transfer operation.

Figure 6:
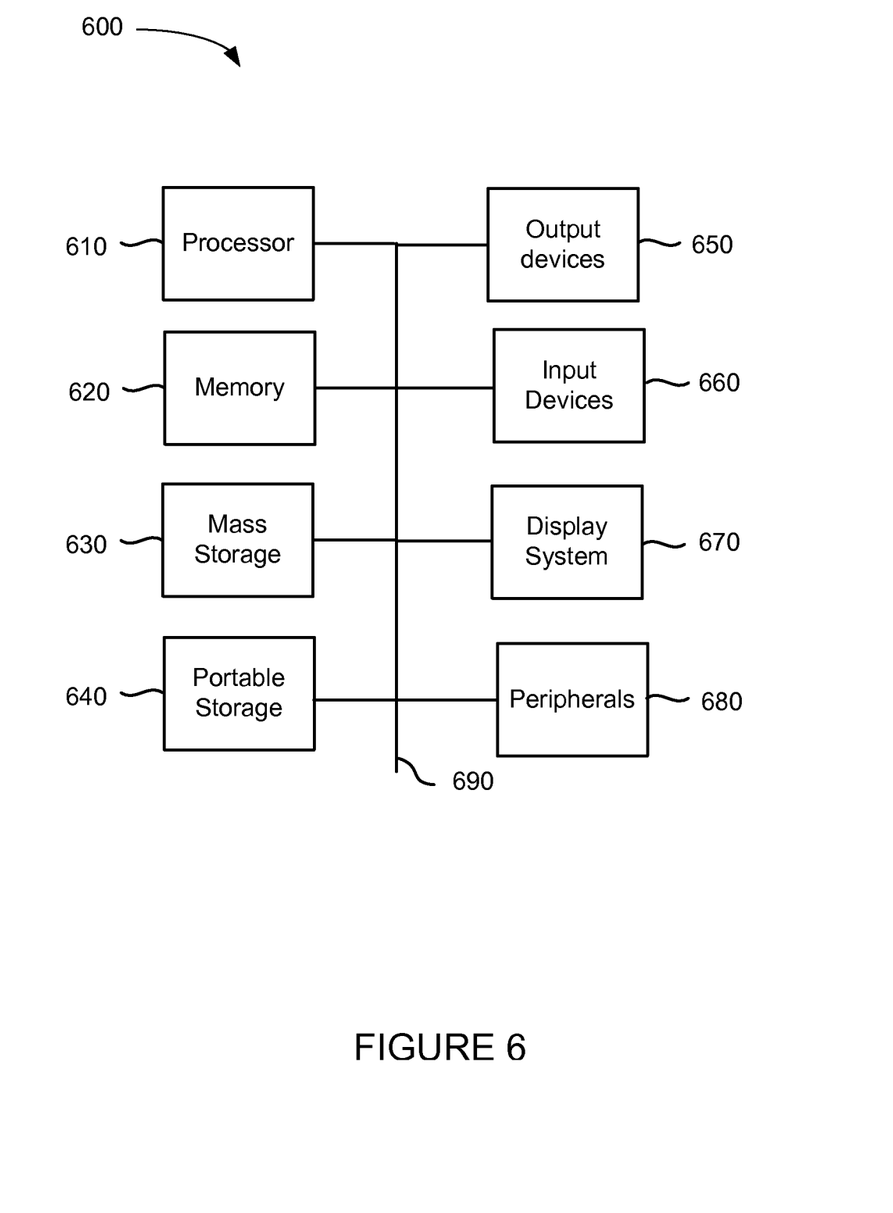
FIG. 6 is a block diagram of an exemplary computing device for implementing the present technology.

FIG. 6 illustrates an exemplary computing system 600 that may be used to implement a computing device for use with the present technology. The computing system 600 of FIG. 6 includes one or more processors 610 and memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 620.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for deploying software in a multi-instance node in a computing device, the method comprising:
    identifying a core-memory ratio for a single instance execution of a software program, wherein the identifying is performed via an automated testing application that measures CPU usage of the computing device over a period of time, and the core-memory ratio corresponds to an allocated number of CPU cores associated with the computing device for use with the software program;
    allocating a number of instances of the software program to deploy in a multi-instance database based on the identified core-memory ratio;
    executing the allocated number of instances of the software program on the computing device via a multi-threaded program that ensures that the identified number of instances are started or terminated at least partially simultaneously; and
    applying the identified core-memory ratio to each executed instance on the computing device by a module stored in memory and executed by a processor.

2. The method of claim 1, wherein identifying the core memory ratio includes setting one or more software parameters and executing the software program with the set parameters.

3. The method of claim 1, wherein the core-memory ratio is identified based on CPU usage associated with the computing device.

4. The method of claim 3, wherein identifying the core-memory ratio includes calculating the CPU usage for a software application when a set number of CPU cores of the computing device is allocated to the software application.

5. The method of claim 4, wherein calculating the core-memory ratio includes:
    monitoring that the CPU usage for the software application for a number of CPU cores is less than a threshold; and
    detecting the CPU usage for the software application when the set number of CPU cores being allocated for the software is changed.

6. The method of claim 5, wherein the set number of CPU cores being allocated for the software application is increased.

7. The method of claim 5, wherein the threshold is 85%.

8. The method of claim 1, wherein an optimal core-memory ratio is applied to each instance within a shared memory system.

9. The method of claim 1, further comprising loading data into each instance in parallel.

10. The method of claim 9, wherein the loading is performed by a set number of CPU cores based on CPU usage.

11. A non-transitory computer readable storage medium having embodied thereon a program, the program being executable by a processor to perform a method for deploying software in a multi-instance node in a computing device, the method comprising:
    identifying a core-memory ratio for a single instance execution of a software program, wherein the identifying is performed via an automated testing application that measures CPU usage of the computing device over a period of time, and the core-memory ratio corresponds to an allocated number of CPU cores associated with the computing device for use with the software program;
    allocating a number of instances of the software program to deploy in a multi-instance database based on the identified core-memory ratio;
    executing the allocated number of instances of the software program on the computing device via a multi-threaded program that ensures that the identified number of instances are started or terminated at least partially simultaneously; and
    applying the identified core-memory ratio to each executed instance on the computing device by a module stored in memory and executed by a processor.

12. The non-transitory computer readable storage medium of claim 11, wherein identifying the core memory ratio includes setting one or more software parameters and executing the software program with the set parameters.

13. The non-transitory computer readable storage medium of claim 11, wherein the core-memory ratio is identified based on CPU usage associated with the computing device.

14. The non-transitory computer readable storage medium of claim 13, wherein identifying the core-memory ratio includes calculating the CPU usage for a software application when a set number of CPU cores of the computing device is allocated to the software application.

15. The non-transitory computer readable storage medium of claim 14, wherein calculating the core-memory ratio includes:
    monitoring that the CPU usage for the software application for a number of CPU cores is less than a threshold; and
    detecting the CPU usage for the software application when the set number of CPU cores being allocated for the software application is changed.

16. The non-transitory computer readable storage medium of claim 15, wherein the set number of CPU cores being allocated for the software application is increased.

17. The non-transitory computer readable storage medium of claim 15, wherein the threshold is 85%.

18. The non-transitory computer readable storage medium of claim 11, wherein an optimal core-memory ratio is applied to each instance within a shared memory system.

19. The non-transitory computer readable storage medium of claim 11, further comprising loading data into each instance in parallel.

20. The non-transitory computer readable storage medium of claim 19, wherein the loading is performed by a set number of CPU cores based on CPU usage.

21. A system for deploying software in a multi-instance node, the system comprising:

a processor;

memory; and one or more modules stored in memory and executable by the processor to:

identify a core-memory ratio for a single instance execution of a software program, wherein the identifying is performed via an automated testing application that measures CPU usage of a computing device over a period of time, and the core-memory ratio corresponds to an allocated number of CPU cores associated with the computing device for use with the software program, allocate a number of instances of the software program to deploy in a multi-instance database based on the identified core-memory ratio, execute the allocated number of instances of the software program on the computing device via a multi-threaded program that ensures that the identified number of instances are started or terminated at least partially simultaneously, and apply the identified core-memory ratio to each executed instance on the computing device.

22. The system of claim 21, wherein identifying the core memory ratio includes setting one or more software parameters and executing the software program with the set parameters.

23. The system of claim 21, wherein the core-memory ratio is identified based on CPU usage associated with the computing device.

24. The system of claim 23, wherein identifying the core-memory ratio includes calculating the CPU usage for a software application when a set number of CPU cores of the computing device is allocated to the software application.

25. The system of claim 24, wherein calculating the core-memory ratio includes:

monitoring that the CPU usage for the software application for a number of CPU cores is less than a threshold; and detecting the CPU usage for the software application when the set number of CPU cores being allocated for the software is changed.

26. The system of claim 25, wherein the set number of CPU cores being allocated for the software application is increased.

27. The system of claim 25, wherein the threshold is 85%.

28. The system of claim 21, wherein an optimal core-memory ratio is applied to each instance within a shared memory system.

29. The system of claim 21, further comprising loading data into each instance in parallel.

30. The system of claim 29, wherein the loading is performed by a set number of CPU cores based on CPU usage.

* * * * *